April 3, 1956     W. E. KIRKPATRICK     2,740,837
SEMICONDUCTOR SIGNAL TRANSLATING DEVICES
Filed March 30, 1950     6 Sheets-Sheet 1
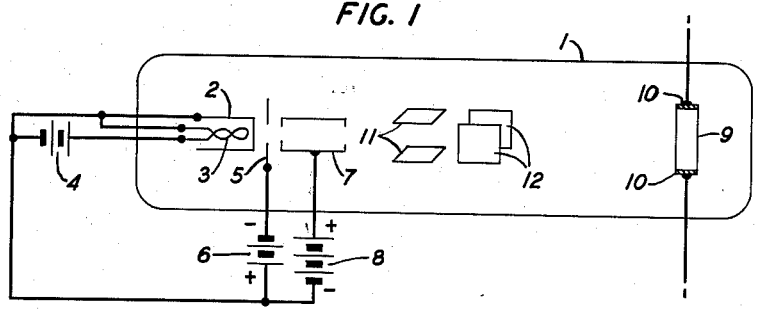
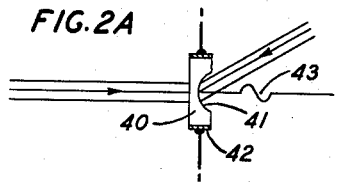
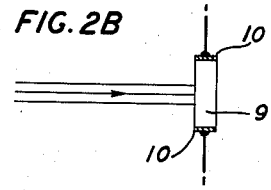
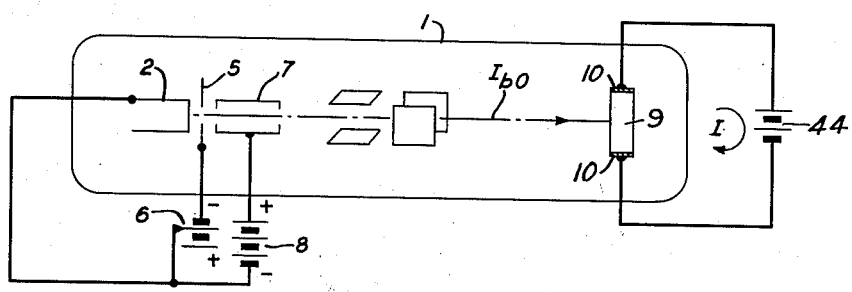
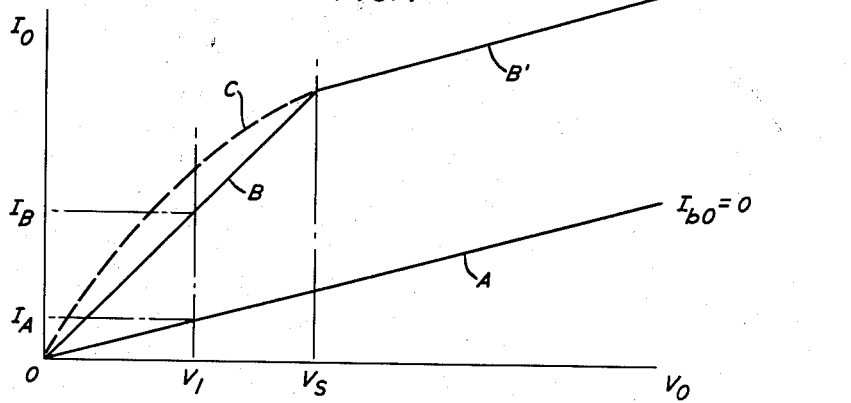
INVENTOR
W. E. KIRKPATRICK
BY
Franklin Mohr
ATTORNEY

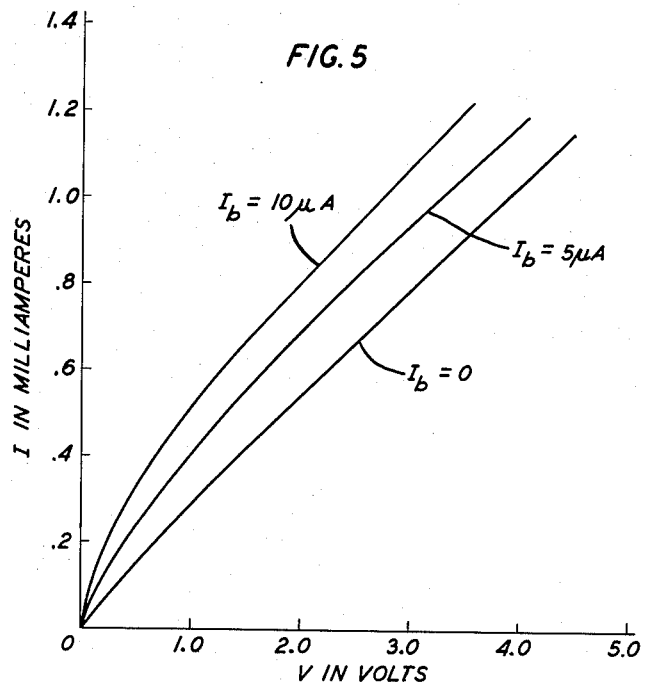
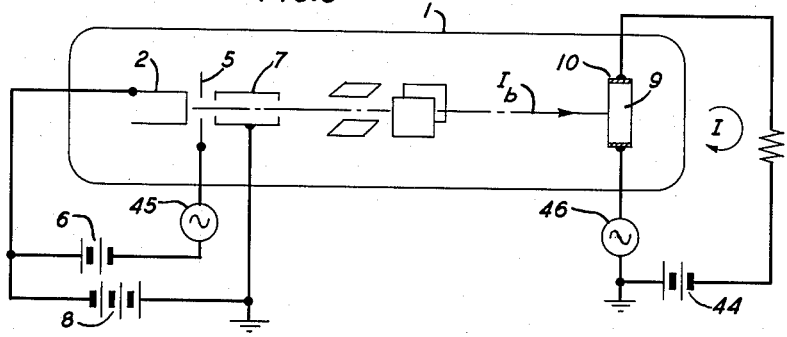
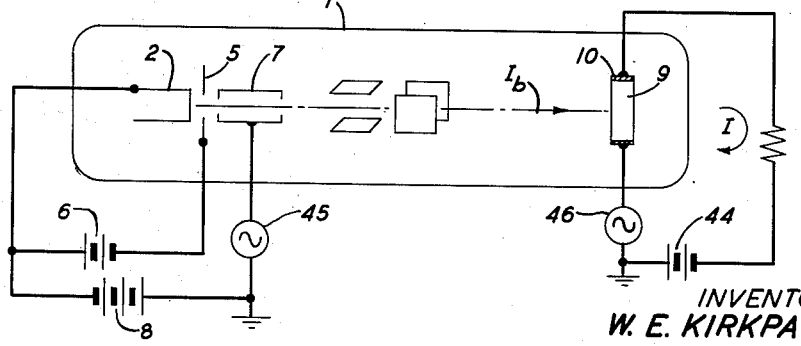

INVENTOR
W. E. KIRKPATRICK
BY Franklin Mohr
ATTORNEY

April 3, 1956     W. E. KIRKPATRICK     2,740,837
SEMICONDUCTOR SIGNAL TRANSLATING DEVICES
Filed March 30, 1950     6 Sheets—Sheet 6

INVENTOR
W. E. KIRKPATRICK
BY Franklin Mohr
ATTORNEY

United States Patent Office 2,740,837
Patented Apr. 3, 1956

2,740,837

SEMICONDUCTOR SIGNAL TRANSLATING DEVICES

William E. Kirkpatrick, Chatham, N. J., assignor to Bell Telephone Laboratories, Incorporated, New York, N. Y., a corporation of New York Application March 30, 1950, Serial No. 152,966

5 Claims. (Cl. 179—15)

This invention relates to signal translating devices, such as modulators, demodulators, multiplex distributors, time division multiplex systems, and the like, and more particularly to systems utilizing bombardment-induced conductivity effects in semiconductors or like materials.

A feature of the invention is that the resistance of the material is varied by external means, namely, bombardment, thereby requiring, in the process of modulation, demodulation, and the like, no non-linearity of resistance in the material as a function of impressed modulating voltage or potential over the operating range of voltages or potentials.

Another feature of the invention is that, in combination with the function of modulating, the bombarding means, e. g., an electron beam, may perform the function of switching as between individual channels in a non-multiplexed system or of scanning as in a time division multiplex system in which successive channels are brought into the transmission link and subsequently dropped out to give place to others.

In the figures:

Fig. 1 is a schematic diagram useful in explaining the invention and showing a vacuum tube and supply circuits therefor, suitable for incorporation in apparatus for practicing the invention;

Figs. 2A and 2B are schematic diagrams of target arrangements for bombardment by a stream of charged particles;

Fig. 3 is a simplified schematic diagram demonstrating basic principles of the invention.

Figs. 4 and 5 are graphs of current-voltage relationships;

Figs. 6 and 7 are schematic diagrams of simplified basic modulating systems;

Figure 12A:
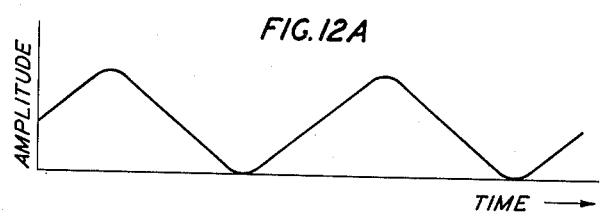
Figure 12B:
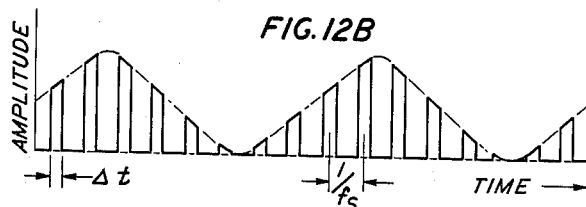
Figure 12C:
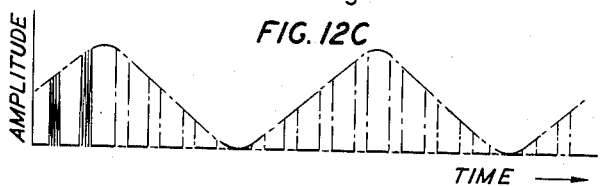
Figure 13:
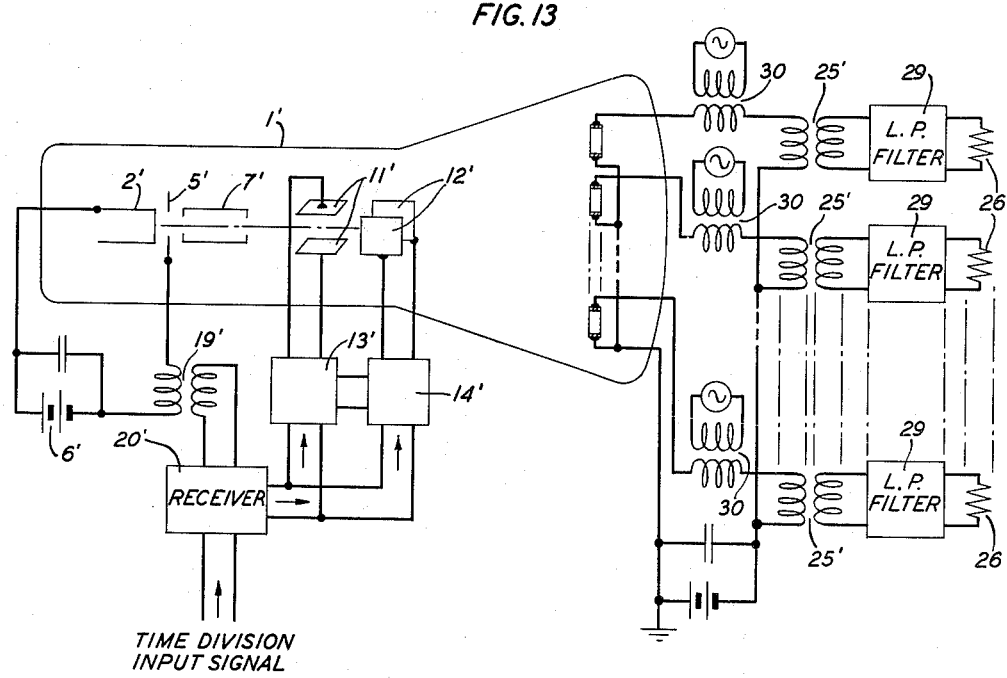

Figs. 12A, 12B, and 12C are graphs of amplitude versus time relationships in a time division multiplex system; and Fig. 13 is a schematic diagram of an alternative form of multiplex signaling system embodying the invention.

The phenomenon of bombardment-induced conductivity as known in the art covers bombardment by electrons, photons, alpha particles, deuterons and various other physical entities. In the embodiments of the invention selected for illustrative purposes herein, bombardment by electrons will be assumed and more particularly there will be described arrangements in which the electrons are produced by thermionic cathodes contained in evacuated envelopes in which certain materials whose conductivity may be effected by electron bombardment are also suitably arranged.

The elementary principles underlying this invention will be explained by reference to Fig. 1. In this figure, reference numeral 1 denotes an evacuated envelope containing three functionally distinguishable systems, namely a gun system, a deflecting system and a target, as indicated. The gun structure, designed to produce a focused pencil of electrons, consists of a thermionic cathode 2, heated by a heater 3, and energized by a heater power source 4 mounted externally to the envelope 1 as shown. A control grid 5 is biased negatively with respect to cathode 2 by a biasing supply source 6. An anode 7 is operated in the neighborhood of +1000 volts with respect to cathode by an anode power source 8. The gun system produces a focused beam of electrons of about 1000 volts energy at the target. The deflection system may be either electrostatic or magnetic, an electrostatic system being shown schematically by plate pairs 11 and 12 in the figure.

The target assembly consists of a block 9 of suitable material in which electron bombardment-induced conductivity effects are observable, mounted between a pair of contacts 10. The particular structural forms which the target assembly may take are numerous but two preferred embodiments are shown in Figs. 2A and 2B, respectively. Fig. 2A shows in cross section a circular germanium disc 40 with a dimple 41 ground in one of the flat surfaces so that the center region of the disc is thinner than the edges. In this embodiment, one contact is a plated or otherwise deposited metal ring-like layer 42 continuous about the circular edge of the disc. The second contact is a pointed spring metal wire 43 pressing against the thinned-out center portion. In this embodiment the target assembly is mounted in the tube so that the electron beam strikes either of the surfaces of the material in the neighborhood of the point contact as shown. In Fig. 2B the block 9 may be square and thin, with contacts 10 applied to any two opposite edges of the block as in Fig. 1. In this case the electron beam strikes the flat face of the material, as shown. In either case, since the change in conductivity is associated with the impinging electron beam, the thickness of the material need be no greater than the electron beam will penetrate.

Since only the material penetrated by the electron beam changes its conductivity it is unnecessary to make the region between contacts any larger than that required by the size of the electron beam cross section.

Materials suitable for use in this invention are numerous. They are, in general, those materials which will, under electron bombardment, change their conductivity. Cadmium sulfide and germanium are prominent examples of substances found to possess this property. Published reports list selenium as also definitely in this class and possibly silicon, and lead sulfide. There are reasonable grounds for supposing that many of the photo-conductive materials will show electron bombardment-induced conductivity properties.

With these preliminary remarks, we are now in a position to examine in more detail the nature of the effect which is employed in the present invention.

Fig. 3 shows only those features of Fig. 1 essential to an understanding of the effect, with the addition of a battery 44 connected between the terminals 10. The target circuit current-voltage (I-V) characteristic which applies specifically to the embodiment of Fig. 2B is shown in Fig. 4 for different amounts of beam current which may be selected by changing the grid potential supplied by the variable biasing supply source 6. Thus when 6 is sufficiently negative so that no beam current leaves the gun, the I-V characteristic of the target circuit is a straight line (curve A, $I_{bo}=0$) due to whatever unbombarded conductivity the unit may possess. The effect of the electron beam on the type of special materials used in the target is such as to provide additional current carriers (e. g. electrons) over and beyond those available in the unbombarded materials so that if the beam current $I_{bo}$ is made finite (by making 6 less negative so that $I_{bo}=I'_{bo}$) the potential applied in the target circuit by the battery 44 of potential $V_o$ now makes use of these additional current carriers and the current at any potential, say $V_1$, is greater than when $I_{bo}$ is finite than it is when $I_{bo}=0$. Thus the conductivity at $V_1$ has increased from $I_A/V_1$ to $I_B/V_1$ when the beam current has been increased from zero to $I'_{bo}$ and curve B may be traced out as the characteristic for finite $I_{bo}$.

The total number of additional current carriers made available depends on the total energy (proportional to the product of accelerating voltage and beam current) of the electron beam and upon the target material. It does not depend on $V_o$. While the total number of additional carriers made available does not depend on $V_o$, the amount of those used does, and for lower values of $V_o$, not all those available will be used. In general, as $V_o$ is increased, more of those available are used and at some particular value of $V_o$, say, $V_s$, all additional carriers have been put to use and thereafter the curve BB' merely follows the slope of curve A and runs parallel thereto. This saturation effect is evident in Fig. 4 at $V_s$ where curve B having a greater slope than curve A, joins curve B' which has the same slope as A. In general, the current rise to saturation is not linear so that the dotted curve C is a better probable representation of the actual situation than is curve B.

The curves of Fig. 4 are theoretical curves for a material and contact configuration as in Fig. 2B. The assembly of Fig. 2A has another effect which depends on the point contact and alters the shape of the I–V characteristics as shown in Fig. 5, which was plotted from experimental data.

The production of modulation terms, which is a principal feature of this invention, however, is not dependent on the non-linear I–V characteristic the use of which is already known in the modulator art. The novel feature arises from the fact that modulating products may be derived even from the straight line section B of Fig. 4.

Hence even though the actual curve may be CB' rather than BB', the curvature in itself is not essential to the invention and will merely have the effect of changing the slope from that of A without bombardment to that of C rather than B with bombardment. The degree of modulation depends on the change of slope from the unbombarded to the bombarded condition but modulation will be attained whether the curve C or the straight line B is characteristic of the target material and contact arrangement used.

The mode of operation may be further described with reference to Fig. 6. If the beam current $I_b$ striking the target has a variable component of signal frequency, $f_o$, impressed thereon by modulating potentials from a signal source 45, and the local target circuit has a component of carrier frequency, $f_c$, impressed thereon by carrier potentials from a carrier source 46, then by reason of the variation of resistance of the target material under the bombarding beam, modulation products (i. e., sum and difference frequencies) will appear in the local target current, I.

The production of modulation terms in this fashion is the result of the variation of resistance in a circuit under the control of some action external to the local circuit. The action is similar to that found in the resistance microphone ("Equivalent Modulator Circuits," E. Peterson and L. W. Hussey; B. S. T. J., XVIII, 32–48, Jan. 1939), but the mechanism by which it is produced is different.

It will be well to point out also at this juncture that while I have thus far discussed this effect in terms of a variation in the beam current, it is also possible to produce the same effect by variation of the beam voltage. Thus, in Fig. 3 if the potential of the anode power source 8 is varied instead of the potential of the grid biasing supply 6, curves of the same general shape as those given in Fig. 4 may be obtained. Indeed for any one value of $I_b$, various curves may be obtained since an increase in accelerating voltage increases the number of additional current carriers created in the target material. This is to be expected since the production of each current carrier requires the dissipation of a certain amount of energy and if more energy is available in the increased accelerating voltage, more current carriers will be produced. Thus if, as in Fig. 7, the input signal is impressed upon the accelerating electrode 7, modulation product currents of the signal and carrier frequencies will circulate in the local target circuit.

With the background of basic principles now laid, a number of illustrative embodiments of the invention will be described.

Figure 8:
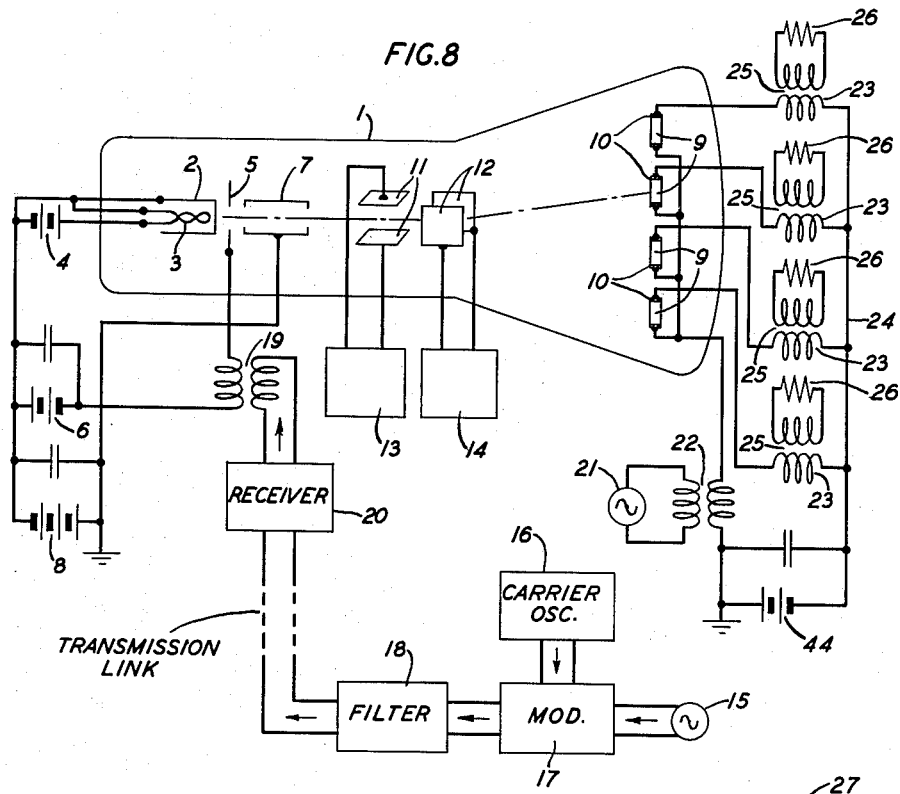
Figs. 8 and 9 are schematic diagrams of switching signaling systems employing the invention.

Fig. 8 is a schematic diagram of vacuum tube elements and circuit components for a four-unit target array, it being understood that the number is merely illustrative and that either more or fewer units are permissible. The reference numbers assigned to this figure are accorded the same significance of those of Fig. 1. Sources of deflecting potentials 13 and 14 are provided to drive the respective plate sets 11 and 12. For static deflection, 13 and 14 need only be adjustable direct-current sources. In the case of cyclical scanning of the target elements the potentials supplied by 13 and 14 will be the appropriate alternating-current and direct-current potentials required to effect such scanning.

For purposes of illustration, let us now suppose that some original intelligence from a signal source 15, Fig. 8, of frequency $f_o$, contained in the band, say, from 0 to 3000 cycles is required to be transmitted by radio link or otherwise to a distant point. In the usual way, the signal along with carrier energy of frequency $f_c$ from a carrier generator 16 of the order of, say, 1 megacycle, is fed into a modulator 17. From the modulator output a filter 18 selects the desired modulated frequency band $f_c \pm f_o$ which is then transmitted, as by a radio link, or other transmission channel, to the input of a transformer 19 through a receiver 20. We then have impressed on the beam current, by means of the secondary winding of the transformer 19 and the regulating effect of the grid 5 connected thereto, variations at the frequency $f_c \pm f_o$. It is desired to demodulate the $f_c \pm f_o$ frequency to recover the $f_o$ speech or other intelligence and also to switch this demodulated signal to any one of four output channels I, II, III and IV. The target end of the tube with its accompanying circuits shows the manner in which this may be achieved by using the demodulating effect of the bombardment-induced conductivity of the target material. In the figure, a voltage of the frequency $f_c$ is supplied by a local carrier generator 21 to the input side of a transformer 22. The secondary of the transformer 22 is connected in common to one contact 10 of each target unit. The other contact of each of the target units feeds through one of a set of individual primaries 23 of transformers 25, then through a common lead 24 back to the other end of the secondary of transformer 22 through the direct-current potential source 44. Thus if the beam is deflected by the action of the sources 13, 14 to rest on any one of the target units, the mixing action taking place in the local circuit on the frequencies present, namely $f_c \pm f_o$ and $f_c$, will produce the difference frequency $f_o$ in the corresponding local circuit comprising one of the transformers 25 connected to one of a plurality of loads 26. The particular output load in which the output will appear depends on which target unit the beam rests on. In the figure, since the electron beam is shown deflected onto unit II, the recovered intelligence will appear at output II. By deflecting the beam to other targets, the original intelligence may be switched to any of the lines desired. Thus the simultaneous action of demodulating and switching has been effected by use of the bombardment-induced conductivity property of the target unit and the deflection capabilities of the electron beam.

The circuit of Fig. 8 thus shows a distributing tube scheme in which a single input channel may be directed as desired to any one of a number of output channels. It is also possible to use the tube incorporating certain circuit changes for the reverse process of selecting any one of a number of input channels, modulating the input information to a different frequency band and sending this modulated signal out over a common channel.

Figure 9:
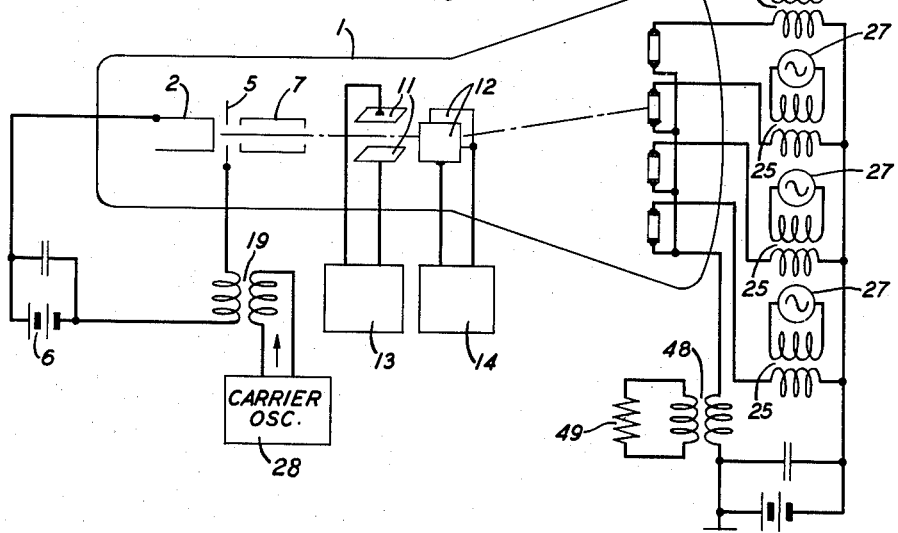

Such an arrangement is shown in Fig. 9 in which the functions of the transformers 25 are now reversed and the transformers are used as input transformers feeding energy from a plurality of input signal sources 27, into the local target circuits where the presence of a carrier frequency injected from a carrier generator 28 through the transformer 19, grid 5, and the bombarding action of the electron beam creates modulation products which may be extracted from the common lead by a tuned transformer 48 and so made available at the output load 49 of transformer 48 in the form of a modulated wave $f_c \pm f_o$. Again, the particular input channel information which will appear as the modulated output depends on the position of the electron beam under the control of the deflecting potential sources 13 and 14, and the beam accordingly acts as the switching mechanism and modulating device.

The uses thus far discussed are switching applications in which the beam rests on a particular target for the duration of the message transmission period. It is also possible with some modifications of external circuits to use the arrangement shown in Figs. 8 and 9 for time division multiplex operation.

Figure 10:
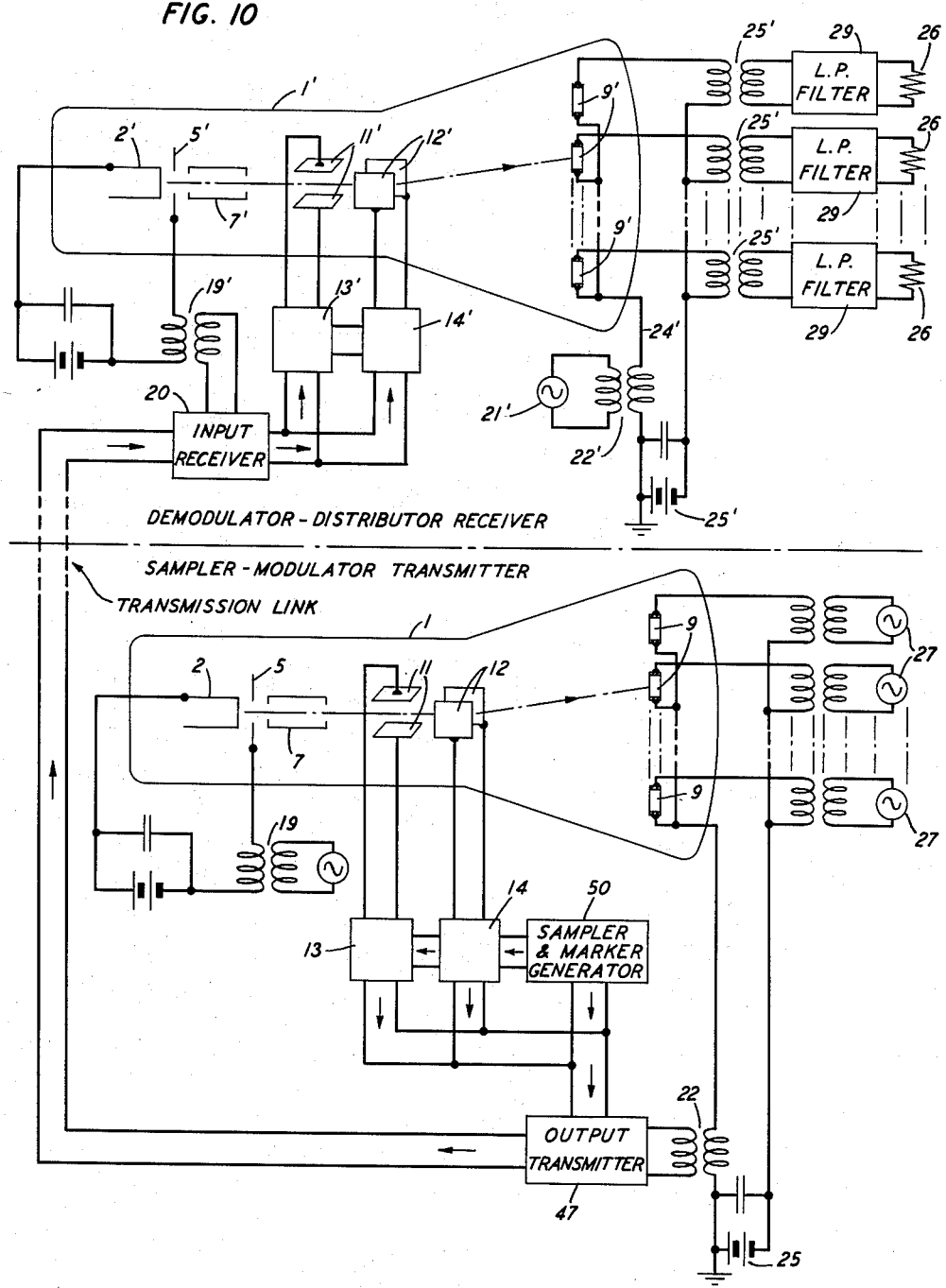
Fig. 10 is a schematic diagram of a multiplex signal system employing the invention.

Fig. 10 shows in composite form an arrangement starting with a number of speech input channels 27, means for sampling and modulating these individual channels so as to obtain a time sequence of modulated outputs which may be sent over a transmission link to a receiving system which demodulates and distributes the received signal to appropriate separate loads or outputs 26. The figure is divided into a lower half which performs the general function of sampling and modulating and an upper half connected to the lower half by a transmission link, which may be a cable or radio link or other transmission channel. The upper half performs the demodulation and distribution needed to deliver the original intelligence to the various output loads.

In more detail, the individual inputs 27 are designated by frequencies $f_{o1}$ $f_{o2}$ . . . $f_{on}$. A sampler and marker generator 50 provides the sampling voltages for the sweep voltage generators 13 and 14 and a marker signal to a transmitter 47 for indexing the transmitted multiplex signal. The sampling tube sweep voltages are supplied by the sources 13 and 14 to the deflection plate sets 11 and 12 and are arranged to sweep, in time sequence, the individual target units 9 at a sampling frequency rate $f_s$ of at least twice $f_o$ where $f_o$ represents any one of the input frequencies. If the highest frequency of $f_o$ is 3000 cycles then $f_s$ may well be 8000 cycles or higher. In this modulating tube the carrier frequency $f_c$ of the order, say, of 1 megacycle is applied to the grid 5 through the transformer 19 so that the time sequence of modulated signal frequencies may be passed through the output transformer 22 and the output transmitter 47 to feed into the transmission link. The energy then appearing on the link is a time sequence of modulated energy in the bands $f_c \pm f_{o1}$, $f_c \pm f_{o2}$, . . . $f_c \pm f_{on}$. The detailed action at the upper tube is the acceptance of the transmitted energy by the input receiver 20 and its energizing control grid 5' so as to modulate the electron beam of the upper tube 1' with the incoming signal. The marker energy originally inserted in the transmission link from the source 50 is also taken from the receiver 20 and used to synchronize a pair of sweep circuits 13' and 14' to direct the electron beam to the proper one of a set of target units 9'. A local carrier generator 21' supplies carrier frequency energy through a transformer 22' to the common lead 24' of a set of local target circuits. Here the mixing action described previously demodulates the input signals and a set of transformers 25' passes the demodulated signals to the load circuits 26. Because of the sampling process a low pass filter 29 is provided in each of the load circuits to remove the sampling frequency and its harmonics which may be just above the recovered signal frequency.

Figure 11:
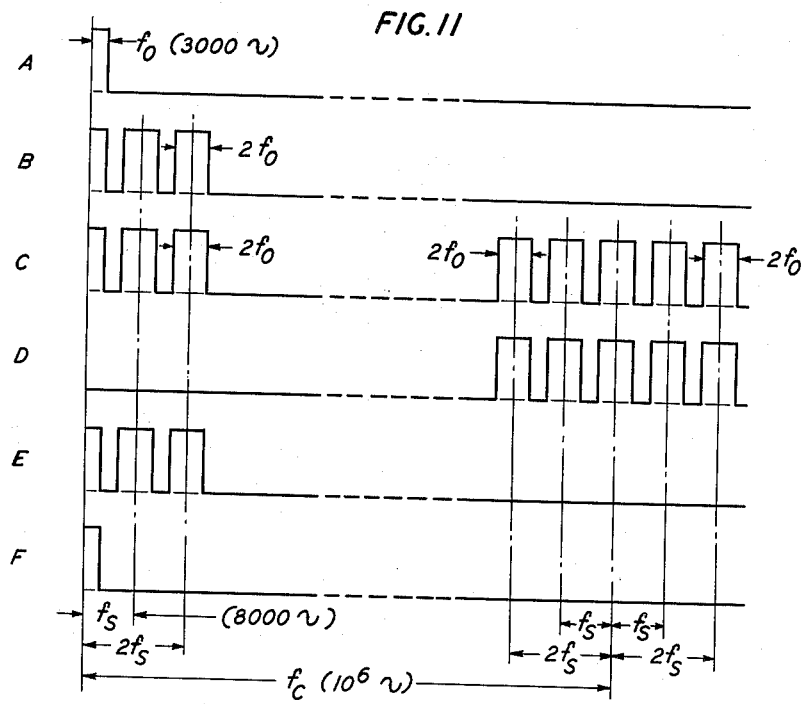
Fig. 11 is a graph of amplitude versus frequency relationships in various parts of the systems disclosed.

Fig. 11 shows the frequency spectrum at various points in the transmission circuit of Fig. 10. At (A) the original speech channel, $f_o$ (that is, any one of $f_{o1}$, $f_{o2}$, . . . $f_{on}$) is shown. At (B) the sampling procedure gives rise to additional frequency bands each of width $2f_o$ centered about $f_s$, $2f_s$, etc. At (C) modulation by carrier $f_c$ has taken place and additional frequency bands have sprung up about the carrier frequency. These modulation products appear as bands of energy of width $2f_o$ with centers at 0, $f_s$, $2f_s$, etc. on either side of $f_c$. This is the output appearing at the transformer 22 of Fig. 10. The output transmitter stage 47 contains a filter which permits only the energy centered about the carrier frequency to be transmitted. Thus (D) of Fig. 11 represents the energy passing over the transmission link and hence the energy modulating the grid 5'. In the local circuit demodulation takes place and the energy appearing at any one of the transformers 25' has the spectrum shown in Fig. 11E. The low pass filter 29, designed to cut off just above the top frequency of $f_o$, permits only the $f_o$ frequency to appear in the load 26.

An amplitude versus time relation is shown in Fig. 12. In Fig. 12A an input signal of frequency $f_o$ is shown. Fig. 12B shows the wave of Fig. 12A after it has been sampled for short time intervals $\Delta t$ at a rate of $f_s$ samples per second. In Fig. 12C the rectangular envelopes of Fig. 12B have been filled in with the 1-megacycle high frequency wave so that the transmission link has imposed on it a series of rectangular pulses of varying heights which are modulated or changed from zero to full amplitude at a rate determined by the carrier frequency oscillator. The demodulated output appearing at one of the transformers 25' of Fig. 10 consists of the recovered rectangular envelope as already shown by Fig. 12B. The low pass filter 29 restores the original input wave as given by Fig. 12A, which appears at 26. Fig. 12 shows only the time curve of a single one of the input channels 27. The unfilled time intervals between the rectangular energy bursts are available to accommodate other channels so that the other inputs may be interleaved with the one shown thus giving rise to the known time division multiplex pattern of transmission.

Fig. 13 shows a system which is quite similar to the demodulator distributor section of Fig. 10 with the exception that here the input signal is a time sequence of modulated rectangular pulses in which each set of pulses relating to a different speech channel is modulated at a different carrier frequency. Thus in place of the $f_c \pm f_{o1}$, $f_c \pm f_{o2}$, . . . $f_c \pm f_{on}$, the input now consists of $f_{c1} \pm f_{o1}$, $f_{c2} \pm f_{o2}$, . . . $f_{cn} \pm f_{on}$. Here again marker energy from the input wave directs the distribution of this input wave to the correct targets in order that the desired modulated energy burst is fed to the correct target so that demodulation may take place and the original input channel energy may be recovered at the desired one of the various output loads 26. The particular advantage of this demodulator distributor over that of Fig. 10 is that cross-talk is reduced since the local carriers required for demodulating each channel are different and input energy which is intended for one target but which gets to another does not appear as speech energy in the incorrect output circuit. The pulses impressed upon the system of Fig. 13 may be produced in a conventional modulating terminal.

The figures for circuit illustration show the particular target embodiment of Fig. 2B but it will be recognized that the one shown in Fig. 2A is also suitable and still other shapes and arrangements may readily be devised.

Also in the circuit drawings a linear assembly of targets is depicted but this is for illustration only and other mechanical arrangements are possible, such as two and even three dimensional arrays of targets, and other variations which will occur to those skilled in the art.

To supplement the above description of the invention and the illustrative embodiments the following theoretical discussion of the modulating action is set forth.

In general, we may write from Fig. 4, $$I = f(I_b, V) \tag{1}$$

where $I$, $I_b$ and $V$ contain both alternating-current and direct-current components and we can further specify that:

$$\begin{aligned} I &= I_o + i \\ I_b &= I_{bo} + i_f \\ V &= V_o + v \end{aligned} \tag{2}$$

in which the zero subscripted symbols represent only the direct-current components and the lower case designations are for the alternating-current components, $I$ being the total current through the element 9, $I_b$ being the total beam current, and $V$ being the total voltage acting across the element 9. Then in the manner usual for this type of analysis, we may expand (1) by Taylor's Theorem:

$$I_o + i = f(I_{bo}, V_o) + \frac{\partial I_o}{\partial I_{bo}} i_b + \frac{\partial I_o}{\partial V_o} v +$$
$$\frac{1}{2!}\left[\frac{\partial^2 I_o}{\partial I_{bo}^2} i_b^2 + 2\frac{\partial^2 I_o}{\partial I_{bo} \partial V_o} i_b v + \frac{\partial^2 I_o}{\partial V_o^2} v^2\right] + \cdots \tag{3}$$

Since $$I_o = f(I_{bo}, V_o) \tag{4}$$

we may subtract this from (3) and get the alternating-current equation:

$$i = \frac{\partial I_o}{\partial I_{bo}} i_b + \frac{\partial I_o}{\partial V_o} v +$$
$$\frac{1}{2!}\left[\frac{\partial^2 I_o}{\partial I_{bo}^2} i_b^2 + 2\frac{\partial^2 I_o}{\partial I_{bo} \partial V_o} i_b v + \frac{\partial^2 I_o}{\partial V_o^2} v^2\right] + \cdots \tag{5}$$

For this equation to have significance, the partial derivatives of $I_o$ with respect to $I_{bo}$ and $V_o$ must not vanish in general. If we look at curve B of Fig. 4, $\partial I_o/\partial V_o$ is a function of $I_{bo}$ only and higher derivatives with respect to $V_o$ will vanish. Similarly from the mechanism by which additional carriers (e. g., electrons) are produced $\partial I_o/\partial I_{bo}$ is a function of $V_o$ only. Hence we may write from (5) if we break off the series at the second order terms and omit the first two linear ones which are not essential to the modulation process:

$$i = \frac{1}{2!}\left[2\frac{\partial^2 I_o}{\partial I_{bo} \partial V_o} i_b v\right] \tag{6}$$

The origin of the sum and difference terms which are necessary for modulation processes may be more readily seen if we write $i_b$ in terms of the alternating-current voltage $e_g$ of grid 5 of Figs. 1 and 3. Thus:

$$i_b = g_m e_g \tag{7}$$

where $g_m$ is the mutual conductance of the triode section of the electron gun. Then we may write (6) as:

$$i = k e_g v \tag{8}$$

where $$k = g_m \frac{\partial^2 I_o}{\partial I_{bo} \partial V_o} \tag{9}$$

Suppose now that:

$$\begin{aligned} e_g &= E_o \cos \omega_o t \\ v &= E_c \cos \omega_c t \end{aligned} \tag{10}$$

where $\omega_o$ represents $2\pi$ times the signal frequency and $\omega_c$ represents $2\pi$ times the carrier frequency. If we insert (10) in (8), we can derive the usual sum and difference frequencies representing the modulation products:

$$i = k E_o E_c \cos \omega_o t \cos \omega_c t =$$
$$\frac{1}{2} k E_o E_c [\cos (\omega_c + \omega_o) t + \cos (\omega_c - \omega_o) t] \tag{11}$$

Another way in which this effect can be analyzed is based on the variation of the target resistance by the bombarding beam. Thus if $e_g$ is given by (10), the resistance between target terminals will consist of a steady term which is the resistance due to $V_o$ and $I_{bo}$, plus a sinusoidally varying term which is the result of the alternating-current variations in the beam due to $e_g$. The simplest form the expression for the total resistance could take would then be $$r = R_o + R \cos \omega_o t \tag{12}$$

This is precisely the characteristic of the ideal resistance microphone the analysis of which is given by Peterson and Hussey, above cited.

Modifications of apparatus and circuits whereby photons, alpha particles, deuterons, or other bombarding agencies may be substituted for electrons will readily suggest themselves to those skilled in the art.

What is claimed is:

1. A signal translating system comprising a germanium element variable as to conductivity under bombardment by electrically charged particles, a circuit passing through said element, a source of carrier waves coupled to said circuit, means for projecting a beam of electrically charged particles along a path into impingement upon said variable conductive element, and means for varying the energy content of said beam to vary the conductivity of said element, whereby modulation products are produced in said circuit.

2. A signal translating system comprising an element of silicon variable as to conductivity under bombardment by electrically charged particles, a circuit including said element, a carrier wave source coupled to said circuit, means for projecting a beam of electrically charged particles along a path into impingement upon said variably conductive element, means for varying the energy content of said beam to vary the conductivity of said element, and a source of modulating signal waves coupled to said energy varying means.

3. A signal translating system comprising a plurality of elements each variable as to conductivity under bombardment by electrically charged particles, a circuit having a branch common to the plurality of elements and having branches each individual to one of said elements, a source of unmodulated carrier waves coupled to said common branch, individual load circuits coupled to said individual branches, means for selectively projecting a beam of electrically charged particles along a path into impingement upon any selected one of said variably conductive elements, means for varying the energy content of said beam to vary the conductivity of the element impinged upon, and a source of signal modulated carrier waves of the same carrier frequency as said source of unmodulated carrier waves coupled to said energy varying means.

4. A signal translating system comprising a plurality of elements variable as to conductivity under bombardment by electrically charged particles, a plurality of circuits each individual to and passing through one of said variably conductive elements, a circuit branch common to all of said variably conductive elements, a carrier transmission line coupled to said common circuit branch, a plurality of signal sources coupled respectively to said individual circuits, means to vary the path of said beam of charged particles to impinge upon any selected one of said variably conductive elements, and a source of unmodulated carrier potentials for varying the energy content of said beam to vary the conductivity of the said selected variably conductive element, whereby modulation products are produced in said circuit.

5. A signal translating system comprising a plurality of elements variable as to conductivity under bombardment by electrically charged particles, a plurality of circuits each individual to and passing through a respective one of said variably conductive elements, a plurality of load circuits coupled respectively to said individual circuits, a plurality of sources of unmodulated carrier potential coupled respectively to said individual circuits, means for projecting a beam of electrically charged particles along a path and for varying the path of said beam to impinge upon any selected one of said variably conductive elements, and a source of modulated carrier potentials for varying the energy content of said beam to vary the conductivity of the said selected variably conductive element, whereby modulation products are produced in said circuit.

References Cited in the file of this patent
UNITED STATES PATENTS

| | | |
|---|---|---|
| 2,307,438 | Whitaker | Jan. 5, 1943 |
| 2,313,209 | Valensi | Mar. 9, 1943 |
| 2,507,590 | Clark | May 16, 1950 |
| 2,543,039 | McKay | Feb. 27, 1951 |
| 2,547,386 | Gray | Apr. 3, 1951 |
| 2,589,460 | Tuller | Mar. 18, 1952 |